INVENTORS
RENÉ LEMAITRE
ROLAND ROCHE
BY
Bacon & Thomas
ATTORNEYS

United States Patent Office 3,228,851
Patented Jan. 11, 1966

3,228,851
PRESSURE TUBE ASSEMBLY FOR A LIQUID
MODERATED NUCLEAR REACTOR
René Lemaître, Colombes, and Roland Roche, Clamart,
France, assignors to Commissariat a l'Énergie Atomique, Paris, France
Filed Apr. 10, 1962, Ser. No. 186,437
Claims priority, application France, Apr. 13, 1961,
858,663, Patent 1,294,274
2 Claims. (Cl. 176—44)

The invention relates to a device for limiting the flow of a coolant fluid into a pressure tube of an atomic reactor, for instance, upon fracture of that tube.

In liquid moderated gas-cooled reactors the fuel elements are generally disposed in pressure tubes traversing the moderator and swept by a coolant gas. The pressure tubes withstand the pressure of the gas and allow the tank containing the moderator to have only the thickness necessary to withstand the hydrostatic pressure of the moderator.

Under these circumstances, rupture of a pressure tube, allowing gas under pressure to pass into the tank, would have serious consequences, if no provision were made for preventing continued flow of coolant gas into the tube upon failure of the latter. If unrestricted flow occurred for some time then the pressure in the moderator tank would rise and give way to explosion hazards. It is difficult to design rapid closure devices operating automatically in the case of rupture which are completely reliable and have dimensions which are compatible with the space available.

An object of the invention is to provide a simple solution to this problem in the form of a device which produces a small head loss in normal operation and which, in the case of rupture, limits the flow rate in the pressure tube to be protected to a sufficiently low value, so that the period before the admission of gas into the tube ceases is increased and attains a value compatible with the operation of known closure devices.

It should also be noted that the invention allows the devices to operate under conditions which approximate to the normal, the flow on rupture remaining restricted. On the contrary, in the absence of flow-limiting devices, the closure device should shut off an exceptionally large flow.

According to the invention, a device is provided for limiting to a predetermined value the flow of a fluid in a conduit, particularly in a pressure tube in a nuclear reactor, which device comprises a convergent-divergent tube interposed in the conduit and having a minimum cross-section at its neck portion such that the rate of flow at the neck portion is subsonic in the normal state and becomes sonic for a flow equal to the predetermined value.

In order that the invention may be readily understood, a number of preferred embodiments thereof are described below, by way of example only, in conjunction with the accompanying drawings, in which.

Figure 1:
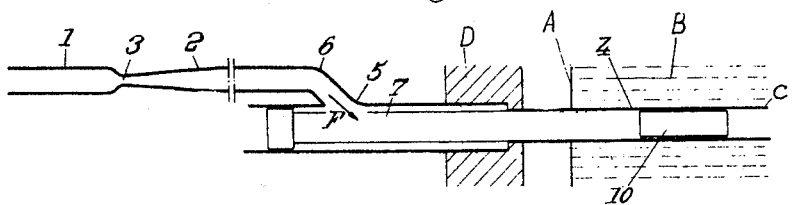
FIGS. 1 to 3 show diagrammatic axial cross-sections of three embodiments of an assembly comprising a reactor channel and a flow-limiting device of the invention.
Figure 2:
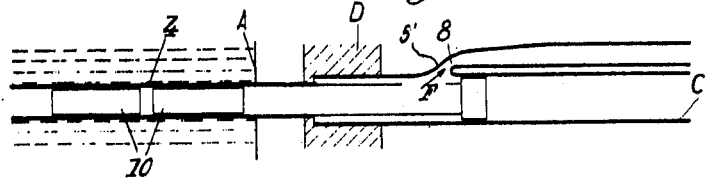
Figure 3:
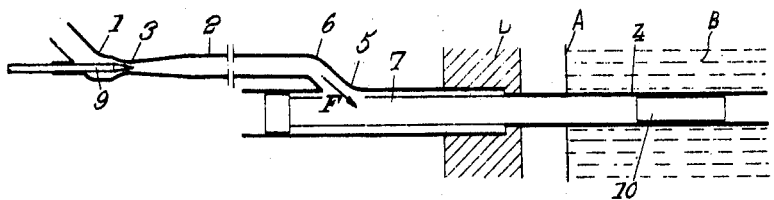

FIGS. 1, 2 and 3 show embodiments of the invention as applied to a nuclear reactor, the core of which is housed in a tank A, occupied by a liquid moderator B and traversed by horizontal channels C in which fuel slugs are disposed. A coolant gas under pressure circulates in the channels C, which are constituted by pressure tubes. The core assembly is enclosed in a biological protection shield D.

The invention proposes means for limiting the flow of the gas in the case of accidental rupture of a channel or other part of the circuit, for the reasons already explained, and also to preserve a sufficient volume of gas for cooling during shut-down of the reactor.

At the inlet to the section of the channel to be protected, a limiting system is disposed, which is constituted by a tube traversed by the gas and having a neck portion cross-section so that the velocity in the normal state is equal to or slightly less than the velocity of sound. The flow is thus limited to a maximum value, independent of the pressure upstream of the tube.

It has been found that it is possible to determine the cross-section of the neck portion in such a manner that the limiting flow is sufficiently low and that, with a subsonic normal state, the pressure drop is sufficiently small to be acceptable.

It is evident that it is sufficient to provide such a device on one side only of the channels, if the other side is provided with arrangements for preventing return flow. In general, however, it is necessary to provide a device according to the invention both at the inlet and the outlet of the channels, because on rupture the gas tends to flow from both sides towards the position of rupture, with reversal of the flow at one end.

For greater clarity, reference is first made to the properties of a steady flow of a gas in a Laval or venturi tube, comprising a convergent section 1, a divergent section 2 and a neck portion 3, as shown for instance in FIG. 1.

In adiabatic flow of a non-viscous perfect gas of negligible conductance (except for the passage through a zone of temperature discontinuity), the pressure $p$ and the specific gravity $\rho$ are connected by a relationship which involves the velocity of sound, $a$, and the ratio, $\gamma$, of the specific heats, which are assumed constant. The suffix 1 relates to the values for a container upstream of the inlet, the suffix 2 to the values for a container downstream of the inlet and the suffix $c$ to the values for the neck portion.

(a) If $p_1 = p_2$, a recompression with deceleration can occur in the convergent section. The velocity at the neck portion is indeterminate, but is limited by the local velocity of sound, $a_c$. The following equations hold, if this is attained:

$$p_c = p_1 \left(\frac{2}{\gamma+1}\right)\left(\frac{\gamma}{\gamma-1}\right)$$

$$\rho_c = \rho_1 \left(\frac{2}{\gamma+1}\right)\left(\frac{1}{\gamma-1}\right)$$

$$a_c = a_1 \sqrt{\left(\frac{2}{\gamma+1}\right)}$$

(b) If $p_1$ is greater than $p_2$, the flow in the convergent section is identical with the preceding flow, the velocity of sound being attained in the neck portion. In the divergent section, immediately downstream of the neck portion, expansion and acceleration of the gas continue, the velocity being supersonic, until a stationary recompression wave is reached, where the impulse is preserved. The velocity becomes subsonic and the pressure and temperature fall rapidly, with loss of energy due to the conduction between the two regions. Following the divergent section, the recompression and deceleration occur as in the case where $p_1 = p_2$. Passage of of the gas through the tube finally becomes equivalent to that of a viscous gas in a throttled conduit, but the flow is limited to a fixed value irrespective of the downstream pressure.

In the real gas hypothesis, it is necessary to take account of head loss:

By way of example, for carbon dioxide gas, the upstream conditions of which are: $p_1 = 55$ hpz., (1 hectopieze = 14.504 p.s.i.) $\theta_1 = 500°$ C., $\rho_1 = 35$ kg./cu. m. and $\gamma = 1.2$ approx., $p_c = 31$ hpz. and $\rho_c = 21.7$ kg./cu. m. The temperature $\theta_c$ is 417° C. and, at the velocity of sound, $a_c$ is 395 m./sec. A flow of 5 kg./sec. for such a gas is sonic for a cross-section of 5.85 sq. cms.

It can be stated that, in practice, though the velocity of sound is not attained, the head loss in a well-shaped tube is of the order of a tenth of the fall in pressure at the neck portion. In the above example, there would be a pressure drop of the order of 2 hpz. for a cross-section of 6 sq. cms. Such a tube would restrict the flow to a value of 5.1 kg./sec., irrespective of the downstream pressure and even if the active channel exploded.

The above considerations give the principle of a flow limiting device constituted by a convergent-divergent tube or venturi, which is very well shaped to give the lowest possible pressure drop for the normal direction of flow and the neck portion cross-section of which constitutes a compromise between the pressure drop allowable for the normal subsonic state and the leakage rate in the case of rupture of the channel. If a higher leakage rate is taken, for example, 13 kg./sec., for the same gas and the same normal state flow as above, a cross-section of 15 sq. cms. can be chosen, for which the head-loss in the normal state is not more than about 0.2 hpz.

As the velocity of sound is not normally attained in the neck portion, it is possible in case of need to adjust the flow by another throttling.

It clearly is sufficient for the tube to be well shaped for the normal direction of flow, because if the flow reverses, energy losses due, for instance, to slip cause no inconvenience.

In the embodiment of FIG. 1, a Laval or venturi tube 1, 2, 3 is disposed upstream of a pressure tube 4 constituting the section of a channel C to be protected. The venturi is disposed, for example, in proximity to a connection 5 between an inlet pipe 6 and an extension 7 of the channel 4. Another venturi, arranged to be normally traversed by the gas leaving the reactor, is disposed downstream of the pressure tube 4.

The venturi can be combined with the elbow comprising the connection 5 of the inlet pipe or the connection 5' of the outlet pipe, as shown in FIG. 2, where the curved part 8 is reduced to form the neck portion of the tube. Between the connection and the neck portion, the cross-section diminishes considerably, until it becomes a convergent section of normal operation. In the divergent section of the neck portion, the increase in cross-section is much more progressive.

A mechanism for adjustment of the neck portion cross-section can be combined with the venturi, in order to obtain both the above-described results and to regulate the flow by throttling, to the point of closure, if desired.

This mechanism is so chosen that the neck portion cross-section of the tube is as small as possible for a given flow and pressure drop, whether or not the velocity of sound is attained in the normal state.

Of the various suitable throttle mechanisms, the venturi needle-valve 9, shown in FIG. 3, is among the most advantageous, as it is well-known and permits accurate regulation. The regulating members always have satisfactorily aerodynamic shapes and prevent pulsatory and vibratory phenomena from securing in the normal subsonic state.

If desired, the mechanism of the invention can include control arrangements for the closure member which operate the latter in the case of rupture of the channel to provide protection. These arrangements are known to those skilled in the art and are operated by sudden pressure-release in the tube on breakage.

In the various embodiments shown, it is assumed that the gas supply tubes provided with flow-limiting devices are not co-axial with the channel. However, these tubes can be mounted in axial extensions of the channels 4, if the circulation means for the fuel slugs 10 allow.

Figure 4:
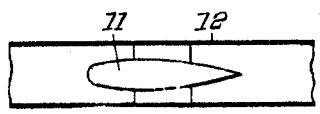
FIG. 4 shows a flow-limiting device according to a further embodiment of the invention.

The neck portion of the venturi tube, for limiting the flow, can have any desired shape. FIG. 4 shows a shaped body 11 located axially in a tube 12.

We claim:
1. In a liquid moderated nuclear reactor, a pressure tube assembly comprising a pressure tube, first conducting means for conducting a fluid coolant under pressure to an inlet at one end of said pressure tube and second conducting means for conducting said coolant from an outlet at the other end of said pressure tube, and a pair of restrictor nozzles located respectively in said first and second conducting means each being located close to said pressure tube inlet and outlet, respectively, each of said nozzles having a neck portion cross-section such that the flow in the neck portion may be kept subsonic in normal operation and becomes sonic if the rate of flow increases to a predetermined value.

2. In a liquid moderated nuclear reactor, the assembly as defined in claim 1 including adjustable means for adjusting and closing the area of the cross-sectional area of the neck portion of at least one of said nozzles.

References Cited by the Examiner

Badger et al.: Elements of Chemical Engineering, 1936, pages 48–50, publ. by McGraw-Hill.

REUBEN EPSTEIN, *Primary Examiner.*

CARL D. QUARFORTH, *Examiner.*

M. R. DINNIN, *Assistant Examiner.*